United States Patent
Tee et al.

(10) Patent No.: US 9,203,669 B2
(45) Date of Patent: Dec. 1, 2015

(54) APPARATUS AND METHOD USING MULTIPLE MODULATION SCHEMES IN AN OFDM/OFDMA WIRELESS NETWORK

(75) Inventors: Lai King Tee, Dallas, TX (US);
Cornelius van Rensburg, Dallas, TX (US); Yinong Ding, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 3203 days.

(21) Appl. No.: 11/296,783

(22) Filed: Dec. 7, 2005

(65) Prior Publication Data
US 2006/0171479 A1 Aug. 3, 2006

Related U.S. Application Data

(60) Provisional application No. 60/649,295, filed on Feb. 2, 2005, provisional application No. 60/683,288, filed on May 20, 2005.

(51) Int. Cl.
| | |
|---|---|
| *H04K 1/10* | (2006.01) |
| *H04L 27/28* | (2006.01) |
| *H04L 27/26* | (2006.01) |
| *H04L 27/00* | (2006.01) |
| *H04L 5/02* | (2006.01) |

(52) U.S. Cl.
CPC ........ *H04L 27/2608* (2013.01); *H04L 27/0008* (2013.01); *H04L 5/023* (2013.01)

(58) Field of Classification Search
CPC .. H04L 27/2608; H04L 5/023; H04L 27/0008

USPC .......................................................... 375/260
See application file for complete search history.

(56) References Cited

U.S. PATENT DOCUMENTS

| | | | | |
|---|---|---|---|---|
| 6,480,522 | B1 * | 11/2002 | Hoole et al. | 375/130 |
| 7,072,315 | B1 * | 7/2006 | Liu et al. | 370/329 |
| 2004/0127223 | A1 * | 7/2004 | Li et al. | 455/446 |
| 2005/0113026 | A1 * | 5/2005 | Moorti et al. | 455/63.1 |

OTHER PUBLICATIONS

Adaptive subcarrier and bit allocation for multiuser MIMO-OFDM transmission Zhenping Hu; Guangxi Zhu; Yuan Xia; Gan Liu; Vehicular Technology Conference, 2004. VTC 2004-Spring. 2004 IEEE 59th vol. 2, May 17-19, 2004 pp. 779-783 vol. 2.*
Roh et al., "An Efficient AMC Zone Allocation within H-ARQ for MIMO OFDMA", IEEE C802.16e-04/551; May 11, 2004.*
A. Czylwik, "Adaptive OFDM for wideband radio channels," in Proc. IEEE Globecom. London. U.K., 1996, pp. 713-718.*
T. Keller and L. Hanzo, "Adaptive multicamer modulation: A convenient framework for time-frequency processing in wireless communications," Proceedings of the IEEE. vol. 88, pp. 61 1442, May 2000.*
"Link Adaptation" Wikipedia, the free encyclopedia; http://en.wikipedia.org/wiki/Adaptive_modulation.*

* cited by examiner

Primary Examiner — Nader Bolourchi

(57) ABSTRACT

A flexible and scalable deployment of orthogonal frequency division multiplexing (OFDM) technology in a mobile cellular system, including a system that deploys multiple channels within a common base station, in which different modulation techniques are used to compensate for adjacent-channel interference.

7 Claims, 4 Drawing Sheets

APPARATUS AND METHOD USING MULTIPLE MODULATION SCHEMES IN AN OFDM/OFDMA WIRELESS NETWORK

CROSS-REFERENCE TO RELATED APPLICATION AND CLAIM OF PRIORITY

The present application is related to U.S. Provisional Patent Application No. 60/649,295, filed Feb. 2, 2005, entitled "Apparatus and Method for a Multi-Channel Orthogonal Frequency Division Multiplexing Wireless Network," and to U.S. Provisional Application Patent No. 60/683,288, filed May 20, 2005, entitled "Efficient Methods To Support the Deployment of Multi-Channel OFDM Systems." U.S. Provisional Patent Application Nos. 60/649,295 and 60/683,288 are assigned to the assignee of the present application. The subject matter disclosed in U.S. Provisional Patent Application Nos. 60/649,295 and 60/683,288 is hereby incorporated by reference into the present disclosure as if fully set forth herein. The present application hereby claims priority under 35 U.S.C. §119(e) to U.S. Provisional Patent Application Nos. 60/649,295 and 60/683,288.

TECHNICAL FIELD OF THE INVENTION

The present application relates generally to wireless networks and, more specifically, to an orthogonal frequency division multiplexing (OFDM) wireless network.

BACKGROUND OF THE INVENTION

Orthogonal frequency division multiplexing (OFDM) is a multi-carrier transmission technique in which a user transmits on many orthogonal frequencies (or carriers). The orthogonal carriers are individually modulated and closely spaced, but have minimal interference with one another. This provides high spectral efficiency and resistance to multipath effects. An orthogonal frequency division multiple access (OFDMA) system allows carriers (or sets of sub-carriers) in a subject frequency band to be assigned to different users concurrently, rather than to a single user. Today, OFDM transmission technique is used in both wireline transmission systems and wireless transmission systems. OFDM and OFDMA techniques are also used for wireless digital audio and video broadcasting.

However, conventional OFDM/OFDMA networks may not fully and efficiently utilize the full bandwidth allocated or available to a base station in a wireless network. In particular, OFDM/OFDMA networks do not efficiently utilize the spacing between frequency channels, in the available bandwidth of a given spectrum block.

Therefore, there is a need in the art for improving the spectrum usage efficiency of orthogonal frequency division multiplexing (OFDM) transmission systems and/or orthogonal frequency division multiple access (OFDMA) transmission systems, especially in the scenario of deploying multiple, adjacent OFDM channels.

SUMMARY OF THE INVENTION

In one embodiment, a wireless network base station comprising a channel controller for configuring the wireless network base station to communicate on at least a first channel having a plurality of subcarriers across a first bandwidth allocation and a second channel having a plurality of subcarriers across a second bandwidth allocation. The channel controller selects a first modulation technique to modulate a first subcarrier of the first channel that is proximate to the second channel and selects a second modulation technique to modulate a second subcarrier of the first channel distant from the second channel. The second modulation technique is a higher-order modulation technique than the first modulation technique.

In another embodiment, a wireless network base station is provided having a channel controller for configuring the wireless network base station to communicate on at least a first channel having a plurality of subcarriers across a first bandwidth allocation and a second channel having a plurality of subcarriers across a second bandwidth allocation. The plurality of subcarriers of the first channel comprises a plurality of subsets of the subcarriers of the first channel. Each of the subsets of the subcarriers of the first channel experiences a different amount of adjacent-channel interference caused by the second channel. The wireless network base station uses a different modulation technique for at least two of the subsets of the subcarriers of the first channel. The modulation technique used for each subset of the subcarriers of the first channel is determined at least in part by the amount of adjacent-channel interference experienced by that subset of subcarriers of the first channel.

Also provided is a method of operating a wireless network base station comprising the steps of communicating with a subscriber station on at least a first channel having a plurality of subcarriers across a first bandwidth allocation and a second channel having a plurality of subcarriers across a second bandwidth allocation, wherein the subcarriers of the first channel interfere with subcarriers of the second channel; and using a lower-order modulation technique for some but not all of the subcarriers of the first channel according to the amount of interference caused by the second channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

In some implementations of OFDM-based technology, such as IEEE-802.16×, multiple Fast Fourier Transform (FFT) sizes are supported, corresponding to different channel bandwidths supported by the standard. OFDM standards, however, do not specify the deployment scenario of placing multiple adjacent channels with smaller FFT sizes in a wider bandwidth. Thus, the default configuration for multiple adjacent OFDM channels leads to the relatively lower spectral usage efficiency in the state-of-the-art standards.

The present disclosure provides a flexible and scalable deployment of orthogonal frequency division multiplexing (OFDM) technology in a wireless network system, thereby enabling higher spectral efficiency. The embodiments discussed herein are implemented in a system that employs multiple channels, preferably within a common base station, each of which uses OFDM/OFDMA techniques. Each channel may be used as a transmission link to a single subscriber station. Multiple channels may be used as concurrent transmission links to multiple users. Alternatively, multiple channels may be used to provide a high bandwidth transmission link to a single user, if necessary. Therefore, a wireless network according to the principles of the present disclosure enables scalability and flexibility in meeting the different demands for channel bandwidth of various users.

As used herein, "channel" refers to a contiguous set of frequencies occupying a portion of the frequency spectrum block, which is subdivided into multiple "subcarriers". The number of subcarriers in a channel may be referred to as the "Fast Fourier Transform size" or "FFT size". Those of skill in the art recognize that alternate terms are sometimes used for these concepts, including in particular the use of the term "carrier" in place of "channel" to refer to a contiguous set of frequencies, which is subdivided into multiple "subcarriers", and the use of the term "tones" to refer to the subcarriers. Additionally, when multiple channels are provided in a frequency band, the technical literature may refer to each of the multiple channels as "carriers." In this application, the term channel is used instead. Nonetheless, the principles described herein will be understood by those of skill in the art to apply regardless of the particular terminology used.

Figure 1:
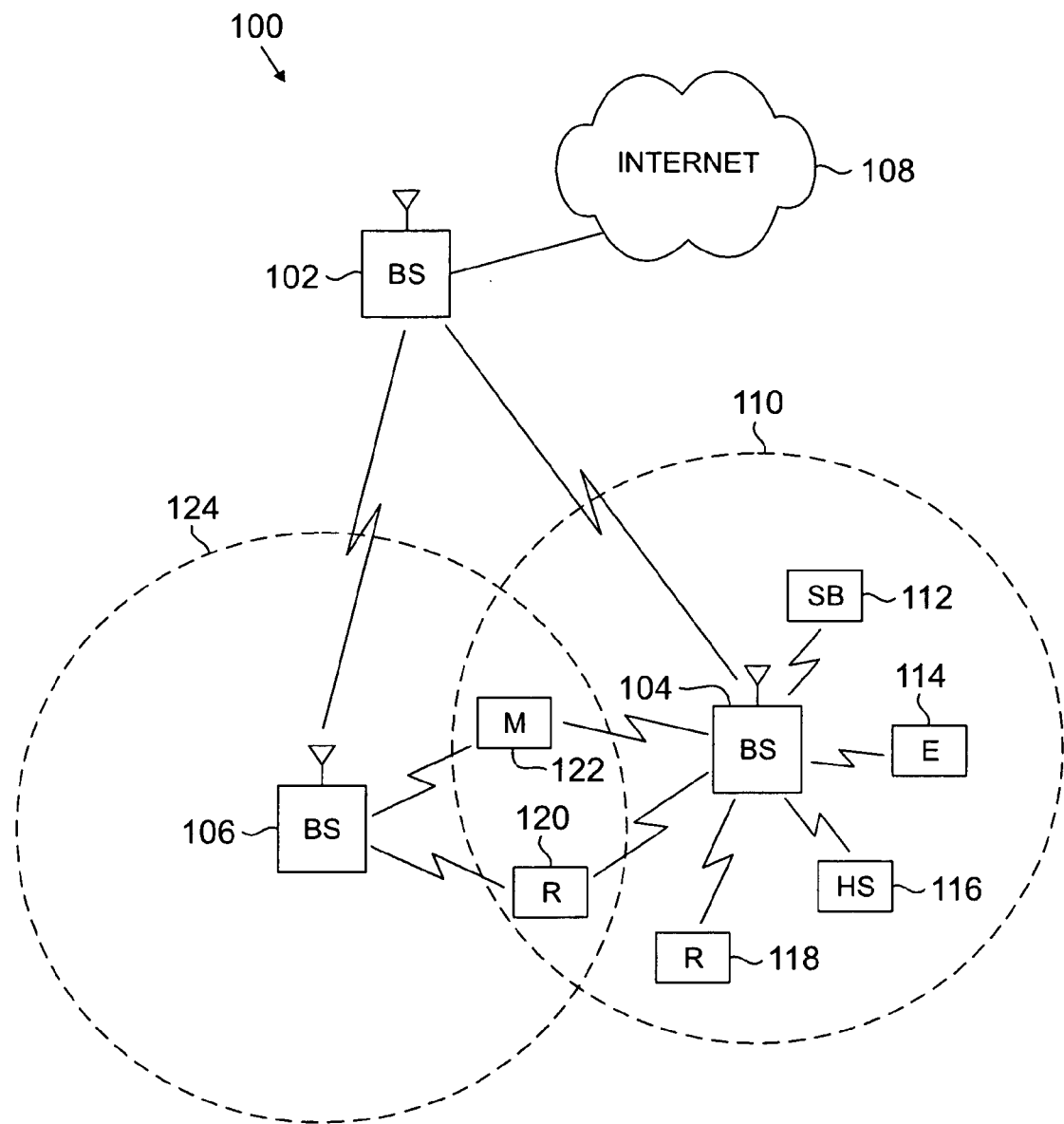
FIG. 1 illustrates an exemplary wireless network, in which orthogonal frequency division multiplexing (OFDM) is deployed in multiple channels according to the principles of the present disclosure.

FIG. 1 illustrates an exemplary wireless network 100, in which orthogonal frequency division multiplexing (OFDM) is deployed in multiple channels according to the principles of the present disclosure. In an embodiment, the wireless network 100 includes base station 102 that is in communication with base station 104 and base station 106. Base station 102 is in communication with Internet 108 or another data network (not shown). Base station 104 provides wireless broadband access to Internet 108, via base station 102, to a plurality of subscriber stations within a coverage area 110 of base station 104 including subscriber station (SS) 112, located in a small business, subscriber station (SS) 114, located in an enterprise, subscriber station (SS) 116, located in a WiFi hotspot, subscriber station (SS) 118, located in a residence, subscriber station (SS) 120, located in another residence, and subscriber station (SS) 122, which is a mobile device.

Base station 106 provides wireless broadband access to Internet 108, via base station 102, to a plurality of subscriber stations within a coverage area 124 of base station 106 including subscriber station 120 and subscriber station 122. In other embodiments, base station 102 may be in communication with either a greater number or a lesser number of base stations. Additionally, while only six subscriber stations have been depicted in FIG. 1, it is understood that in one embodiment, wireless network 100 may be expected to provide wireless broadband access to additional subscriber stations. Alternatively, base station 104 and 106 may be connected directly to the Internet through a wired broadband connection, such as an optical fiber, DSL, cable or T1/E1 line.

It is noted that subscriber station (SS) 120 and subscriber station (SS) 122 are on the edge of the two coverage areas 110 and 124. Subscriber station 120 and subscriber station 122 each communicate with both base station 104 and base station 106 and may be said to be operating in handoff mode, as known to those of skill in the art.

In an embodiment, base stations 102, 104, and 106 may communicate with each other and with subscriber stations 112, 114, 116, 118, 120, 122 using an IEEE-802.16 wireless metropolitan area network standard, for example, an IEEE-802.16e standard. In another embodiment, however, a different wireless protocol may be employed, for example, a HIPERMAN wireless metropolitan area network standard. Base station 102 may communicate through direct line-of-sight or non-line-of-sight with base station 104 and base station 106, depending on the technology used for the wireless backhaul. Base station 104 and base station 106 may each communicate through non-line-of-sight with subscriber stations 112, 114, 116, 118, 120, and 122 using orthogonal frequency division multiplex techniques.

Base station 104 may provide T1-level service to subscriber station 114 associated with the enterprise and fractional T1-level service to subscriber station 112 associated with the small business. Base station 104 may provide wireless backhaul for subscriber station 116 associated with the WiFi hotspot, which may be located in an airport, café, hotel, or college campus. Base station 104 may provide digital subscriber line (DSL) level service to subscriber stations 118, 120 and 122. Subscriber stations 112, 114, 116, 118, 120 and 122 may use the broadband access to the Internet 108 to access voice, data, video, video teleconferencing, and/or other broadband services. In an embodiment, one or more of subscriber stations 112, 114, 116, 118, 120 and 122 may be associated with an access point (AP) of a WiFi WLAN. Subscriber station 122 may include any of a number of mobile devices including a wireless-enabled laptop computer, personal data assistant, notebook, handheld device, or other wireless-enabled device. Subscriber stations 118 and 120 may include a wireless-enabled personal computer, laptop computer, gateway, or other device.

Dotted lines show the approximate extents of the coverage areas 110 and 124, which are shown as approximately circular for the purposes of illustration and explanation only. It should be understood that the coverage areas associated with base stations, for example, coverage areas 110 and 124 associated with base station 104 and base station 106, may have other shapes, including an irregular shape, depending upon the configuration of the base stations and the radio environment that may depend upon natural and man-made obstructions. The coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 110 and 124 of base stations 104 and 106 may extend in the range from less than about 2 kilometers to about fifty kilometers from the base stations.

As is well known in the art, a base station, such as base station 102, 104, or 106, may employ directional antennas to support a plurality of sectors within the coverage area. While in FIG. 1 base stations 104 and 106 are depicted approximately in the center of their associated coverage areas 110 and 124, in other embodiments use of directional antennas may locate the base station near the edge of the coverage area, for example, at the point of a cone-shaped or pear-shaped coverage area.

The connection to the Internet 108 from base station 102 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. Note that in the case of voice-based communications in the form of voice over IP (VoIP), the traffic will be forwarded directly to the Internet gateway instead of the PSTN gateway. The servers, Internet gateway, and public switched telephone network gateway are not shown in FIG. 1. In another embodiment, the connection to the Internet 108 may be provided by different network nodes and equipment.

Figure 2:
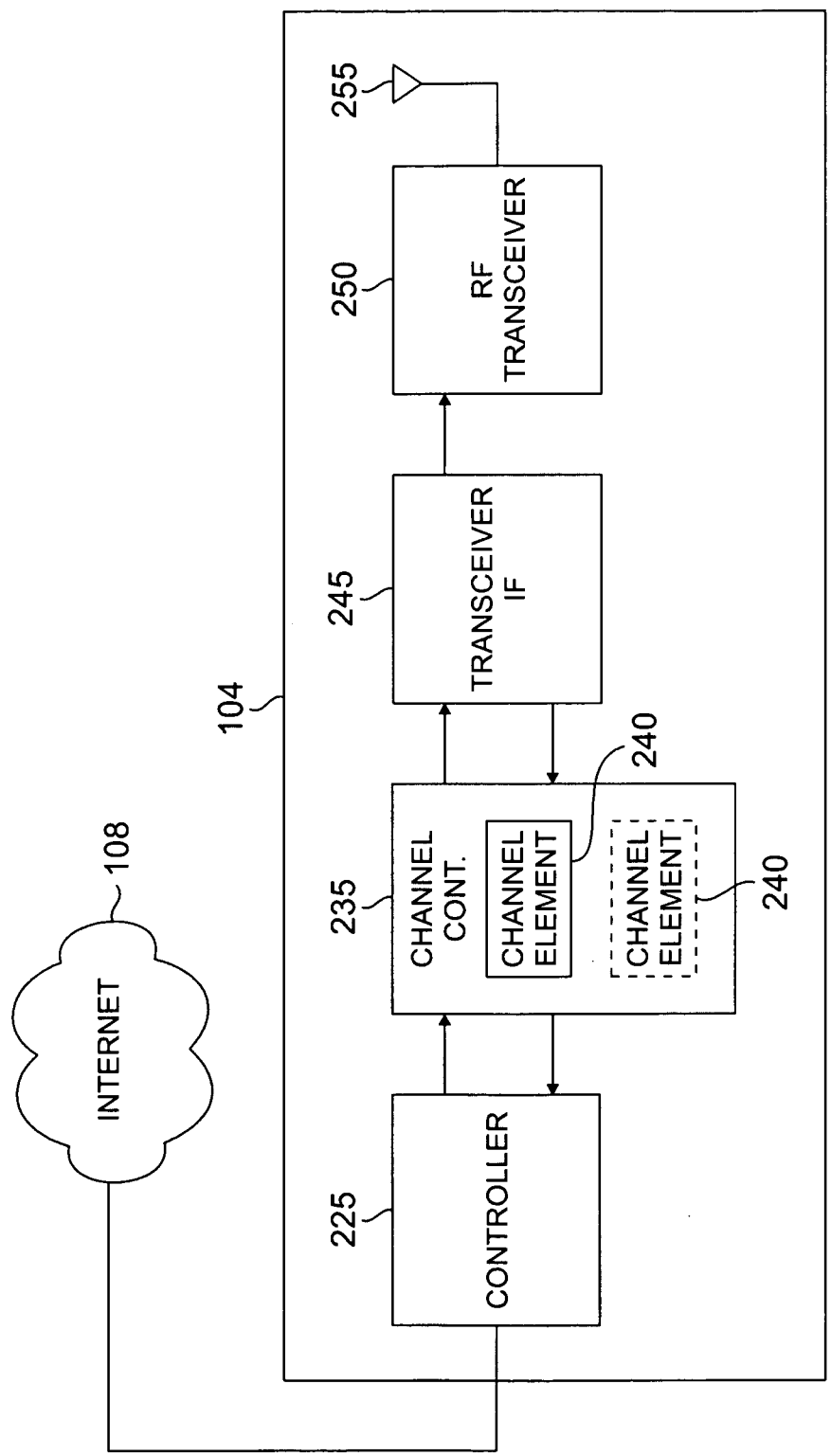
FIG. 2 illustrates a base station in greater detail according to an embodiment of the present disclosure.

FIG. 2 illustrates base station 104 in greater detail according to an embodiment of the present disclosure. Base station 104 is illustrated by way of example only. However, it will be understood that the components illustrated and described with respect to base station 104 are also part of base stations 106 and 102. According to one embodiment, base station 104 comprises controller 225, channel controller 235 (which may comprise at least one channel element 240), transceiver interface (IF) 245, radio frequency (RF) transceiver unit 250, and antenna array 255.

Controller 225 comprises processing circuitry and memory capable of executing an operating program that controls the overall operation of base station 104. In an embodiment, the controller 225 may be operable to communicate with the Internet 108. Under normal conditions, controller 225 directs the operation of channel controller 235, which may comprise a number of channel elements, such as channel element 240, that are each operable to perform bidirectional communication in the forward channel and the reverse channel. In various embodiments, as noted below, one or more additional channel elements 240 may be used to support independent channels, as indicated by channel element 240 having dashed lines. A "forward channel" refers to outbound signals from the base station 104 to subscriber stations 112, 114, 116, 118, 120 and 122 and a "reverse channel" refers to inbound signals from subscriber stations 112, 114, 116, 118, 120 and 122 to base station 104.

Channel element 240 also preferably performs all baseband processing. The baseband processing may include received signal processing, such as processing any digitized received signal to extract the information or data bits conveyed in the received signal, typically including demodulation, decoding, and error correction operations, as known to those of skill in the art. The baseband processing also may include transmit signal processing, such as encoding and modulating the transmit signal, including digital-to-analog conversion, unless a digital transceiver IF is used. Transceiver IF 245 transfers bidirectional channel signals between channel controller 235 and RF transceiver unit 250.

As illustrated here, various embodiments comprise multiple independent channel elements 240, each configured to handle communications on a different channel. Although two channel elements 240 are shown here, various embodiments include a separate channel element 240 for each channel supported, and channel controller 235 can support as many channel elements 240 as required by the particular implementation.

Antenna array 255 transmits forward channel signals received from RF transceiver unit 250 to subscriber stations 112-122 in the coverage area of base station 104. Antenna array 255 is also operable to send to RF transceiver unit 250 reverse channel signals received from subscriber stations 112-122 in the coverage area of the base station 104. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

Figure 3:
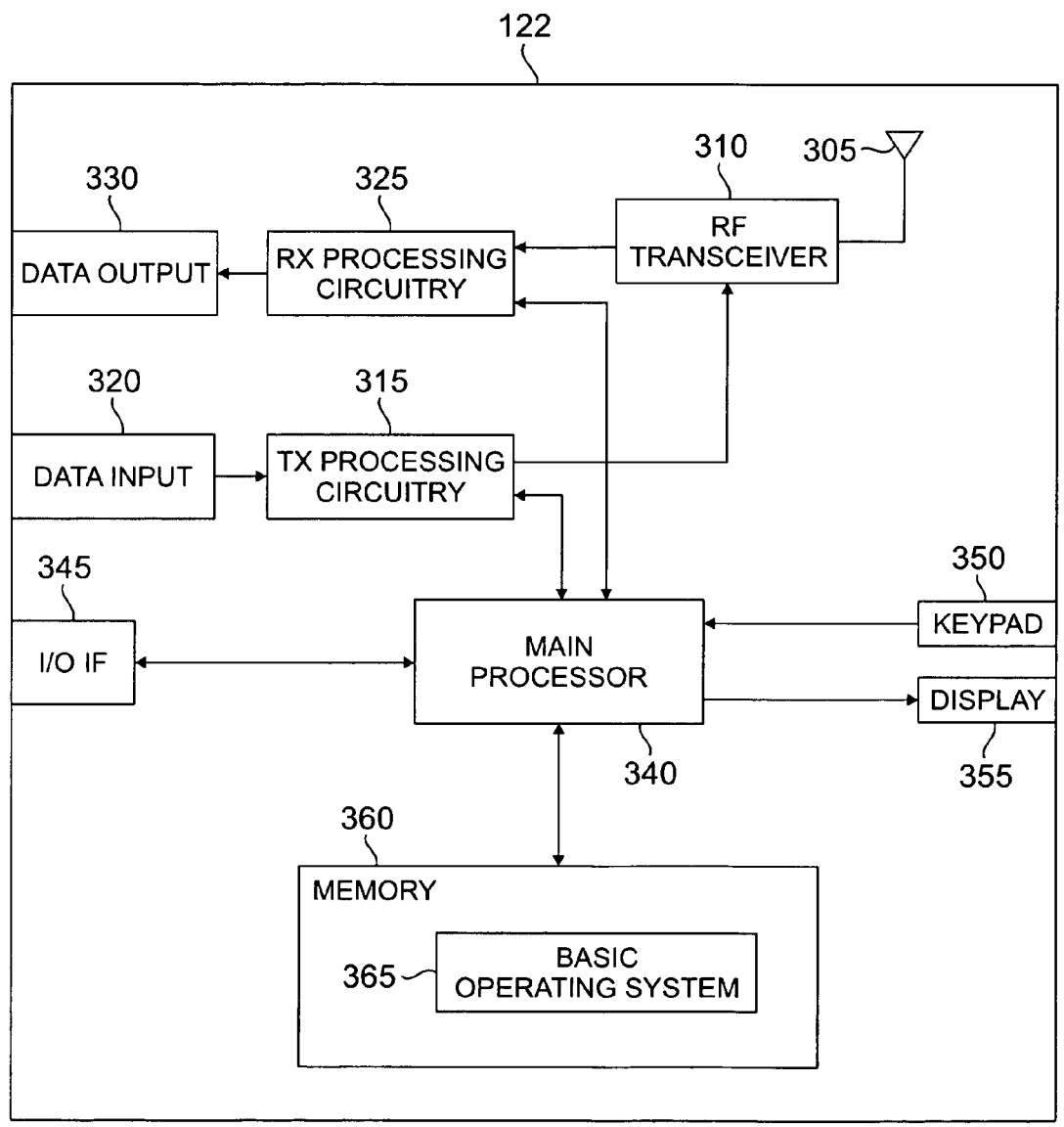
FIG. 3 illustrates a subscriber station in greater detail according to an embodiment of the present disclosure.

FIG. 3 illustrates subscriber station 122 in greater detail according to an embodiment of the present disclosure. Subscriber station 122 is illustrated by way of example only. However, it will be understood that the components illustrated and described with respect to subscriber station 122 also may be part of subscriber stations 112, 114, 116, 118, and/or 120. Subscriber station 122 comprises antenna 305, radio frequency (RF) transceiver 310, transmit (TX) processing circuitry 315, data input 320, receive (RX) processing circuitry 325, and data output 330. Subscriber station 122 also comprises main processor 340, input/output (I/O) interface (IF) 345, keypad 350, display 355, and memory 360.

RF transceiver 310 receives from antenna 305 an incoming RF signal transmitted by base station 104. RF transceiver 310 down-converts the incoming RF signal to produce an intermediate frequency (IF) or a baseband signal. The IF or baseband signal may be sent to receiver processing circuitry 325, which produces a processed baseband signal by filtering, digitizing the baseband or IF signal, additional filtering if necessary, demodulation and/or decoding. Receiver processing circuitry 325 is also operable to transmit the processed baseband signal to data output 330 (e.g., when the processed baseband signal comprises voice data) or to main processor 340 for further processing (e.g., when the processed baseband signal relates to web browsing).

Transmitter processing circuitry 315 receives analog or digital voice data from data input 320 or other outgoing baseband data (e.g., web data, e-mail, interactive video game data and the like) from main processor 340. Transmitter processing circuitry 315 encodes, modulates, multiplexes and/or digitizes the outgoing baseband data to produce a processed baseband or IF signal. RF transceiver 310 receives the outgoing processed baseband or IF signal from transmitter processing circuitry 315. RF transceiver 310 up-converts the baseband or IF signal to an RF signal that may be transmitted via antenna 305.

According to one embodiment, main processor 340 may comprise a microprocessor or microcontroller. Memory 360, which is coupled to main processor 340, may comprise a random access memory (RAM) and/or a non-volatile memory (e.g., Flash or ROM). Main processor 340 executes basic operating system program 365 stored in memory 360 in order to control the overall operation of subscriber station 122. In one such operation, main processor 340 controls the reception of forward channel signals and the transmission of reverse channel signals by RF transceiver 310, receiver processing circuitry 325, and transmitter processing circuitry 315. Main processor 340 may also execute other processes and programs (not shown) resident in memory 360. Main processor 340 may move data into or out of memory 360, as required by an executing process.

Main processor 340 is also coupled to the I/O interface 345. I/O interface 345 provides subscriber station 122 with the ability to connect to other devices, such as laptop computers, handheld computers and the like. I/O interface 345 provides a communication path between these accessories and main processor 340. Main processor 340 is also coupled to keypad 350 and display unit 355. The operator of subscriber station 122 may use keypad 350 to enter data into subscriber station 122. Display 355 may comprise a liquid crystal display capable of rendering text, video, images, and/or graphics from websites. It will be understood that additional embodiments may use other types of displays.

Figure 4:
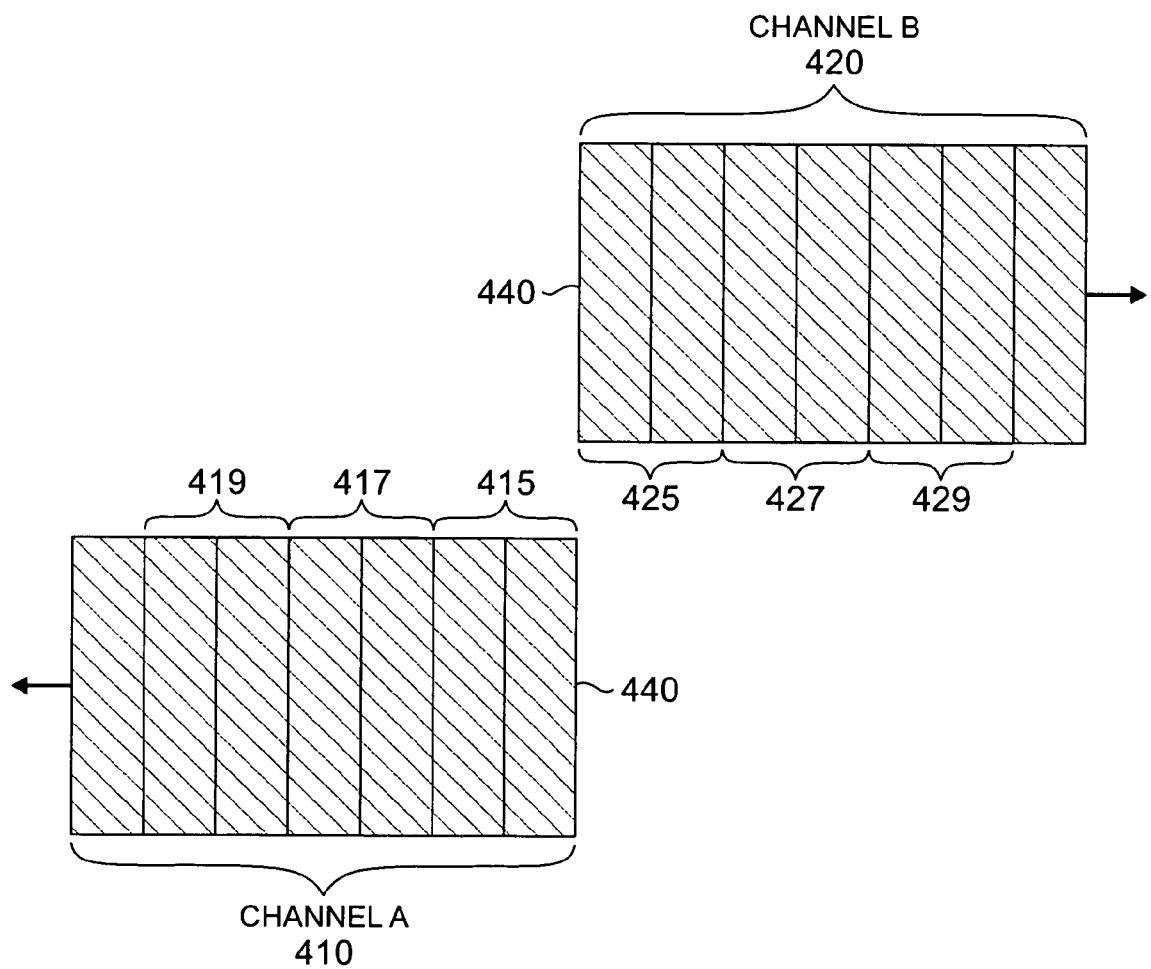
FIG. 4 depicts a simplified block diagram illustrating adjacent channels according to an embodiment of the present disclosure.

FIG. 4 depicts a simplified block diagram illustrating subcarriers of adjacent channels according to an embodiment of the present disclosure. FIG. 4 shows Channel A 410 and Channel B 420, each comprising multiple subcarriers 440. Brackets indicate subcarriers 415, 417, 425 and 427 that are closer to the edges of the bandwidths allocated to Channel A 410 and Channel B 420, where subcarriers 415 may comprises multiple subcarriers, subcarriers 417 may comprise multiple subcarriers, subcarriers 425 may comprise multiple subcarriers, and subcarriers 427 may comprise multiple subcarriers. Brackets also indicate subcarriers 419 and 429 that are closer to the centers of the bandwidths allocated to Channel A 410 and Channel B 420. Edge subcarriers 415 and 417 of Channel A 410 and edge subcarriers 425 and 427 of Channel B 420 do not directly overlap the other channel, but suffer from adjacent-channel interference caused by the other channel.

This simplified diagram only depicts a limited number of subcarriers 440 and channels 410 and 420 and small number of edge subcarriers 415, 417, 425 and 427. Those of skill in the art will recognize that these particulars may vary with the implementation. For example, in some implementations, the number of subcarriers that experience a greater or lesser degree of adjacent channel interference can vary widely, and so the subcarriers referred to as edge subcarriers can, in some implementations, constitute a substantial portion of the total number of subcarriers in a channel.

The present disclosure includes various embodiments in which OFDM techniques are deployed in a scalable way with multiple channels 410/420 placed adjacent to each other within a single base station to make efficient use of a wider channel bandwidth. If the channels 410/420 are adjacent or nearly adjacent to each other, as in FIG. 4, there may be interference in the sub-carriers at the edges of the channel. If the system does not implement channel coding, an error floor is observed that is not diminished or reduced by common techniques of increasing signal-to-noise ratio (SNR), for example, boosting transmit power. In a typical implementation, guard subcarriers that carry no effective user data may be used at the edge of each channel to provide artificial spacing between the adjacent channels, with a subsequent loss of effective bandwidth and reduction of data throughput.

However, with the use of a sufficiently strong error correction code, bit interleaving and/or symbol interleaving across the sub-carriers, the error rate performance generally suffers a much smaller degradation. This is because any errors in the received data due to adjacent interference may be corrected by the use of error correction coding, including bit and/or symbol interleaving across the sub-carriers. As a result, spectral efficiency may be increased because it is not necessary to increase the channel spacing, if the link budget is able to tolerate the relatively small increase in performance degradation.

According to various disclosed embodiments, when quadrature phase-shift keying (QPSK) modulation is used in the desired channel, the performance degradation caused by adjacent channel interference is not significant when the appropriate channel coding and interleaving schemes are used. However, when a 16-quadrature amplitude modulation (16-QAM) scheme is used in the desired channel, the performance degradation is much more significant, for the same channel coding rate and channel spacing.

As such, at least two different methods using higher-order modulation schemes can be used to improve performance when multiple OFDM channels are deployed adjacent or nearly adjacent to each other and with a smaller number of guard subcarriers (or no guard subcarriers). In preferred embodiments, except for the RF transceiver 250, the base station equipment will operate with the full bandwidth of each channel. Thus, a duplicated and independent set of baseband transceiver equipment as implemented in channel element 240 is preferably used for each channel at each base station, as illustrated in FIG. 2. In other respects, the base stations and subscriber stations in the exemplary deployments are as described above in FIGS. 1-3.

In both exemplary embodiments, wireless network 100 supports multiple channels 410/420 in which sub-carriers 440 of the multiple OFDM channels 410/420 are effectively adjacent to each other within a bandwidth range, communicating from a single base station by appropriately configuring some or all of base stations 102, 104 and 106 in wireless network 100. In such an implementation, the edge subcarriers of adjacent channels 410 and 420 will typically experience adjacent channel interference, which is greater in those subcarriers 440 that are closest to the edge of each channel 410 and 420, and therefore closest to the other channel.

For example, in FIG. 4, the subcarriers 415 of channel 410 and subcarriers 425 of channel 420 will tend to experience the greatest adjacent-channel interference. Subcarriers 417 of channel 410 and subcarriers 427 of channel 420 may experience adjacent-channel interference to a lesser degree. Subcarriers 419 of channel 410 and subcarriers 429 of channel 420, nearer to the center of each of these channels, may experience adjacent-channel interference to an even lesser degree, or may not experience it at all.

Each of subcarriers 415, 417, 419, 425, 427, and 429 comprises a subset of the subcarriers of channels 410 and 420, respectively, and the number of subcarriers in each subset may be adjusted by the base station 102 as appropriate according to the amount and nature of the adjacent-channel interference experienced by each subcarrier.

In an exemplary implementation, each channel may cover 1.25 MHz of bandwidth with an FFT size of 128, indicating that each channel has 128 subcarriers, which may be classified as the data, pilot, DC or guard subcarriers. A single base station may, for example, support four such channels adjacent to each other, covering a 5 MHz bandwidth block.

According to one embodiment, base station 104 in wireless network 100 uses a lower-order modulation scheme for data to be loaded onto the subcarriers located near to the edge of the channel. For example, 16-QAM or higher modulation may be used for transmission of most of the data symbols in the subcarriers in the center region of the channel, such as subcarriers 419 and 429, where the least adjacent-channel interference occurs, whereas QPSK modulation scheme may be used for the data symbols loaded onto the subcarriers in the edge region of the channel, such as subcarriers 415, 417, 425 and 427.

The number of edge subcarriers that use a lower order modulation scheme may be adapted based on the adjacent interference situation. Using this technique, the degradation can be reduced as the lower order modulation scheme is more robust to interference. Also, a symbol in the lower-order modulation represents a smaller number of data bits such that the error rate would not be impacted as much as in the case of higher-order modulation symbols representing a larger number of data bits.

According to another embodiment, base station 104 in wireless network 100 uses successively lower-order modulation schemes for the edge subcarriers, such as subcarriers 415, 417, 419, 425, 427 and 429, to avoid performance degradation as caused by adjacent channel interference. For example, instead of using "x" guard subcarriers with no data, as would be typical in such an implementation, the system can use modulation scheme 1 for the "$x_1$" inner-most guard subcarriers, modulation scheme 2 for the next "$x_2$" guard subcarrier and modulation scheme 3 for the "$x_3$", and so forth, where $x_1+x_2+x_3+\ldots+x_n=x$, such that the order of modulation scheme 1 is greater than the order of modulation scheme 2, which is greater than the order of modulation scheme 3, and so forth. Successively lower-order modulation is used as each set of edge subcarriers experiences greater adjacent-channel interference. Note that $x_n$ in the example can be the number of subcarriers that has no data modulation, i.e., guard subcarriers.

In the context of FIG. 4, for example, base station 104 would use a lower-order modulation for subcarriers 415 and 425 than for subcarriers 417 and 427, and a lower-order modulation for subcarriers 417 and 427 than for subcarriers 419 and 429. For example, subcarriers 415 and 425, experiencing the highest adjacent-channel interference, could use binary phase shift keying (BPSK), subcarriers 417 and 427 may use QPSK, and subcarriers 419 and 429 may use 16-QAM. Base station 104 may use an even higher-order modulation for other subcarriers closer to the centers of the channels or experiencing less adjacent channel interference.

The above methods allow a variety of possible deployment schemes. Depending on other design parameters and characteristics of the system, an optimum scheme may be selected. Those of skill in the art will recognize that suitable modulation techniques may include binary phase shift keying (BPSK), quadrature phase shift keying (QPSK), also known as four-symbol quadrature amplitude modulation (4-QAM), eight-symbol phase shift keying (8-PSK), eight-symbol quadrature amplitude modulation (8-QAM), sixteen-symbol quadrature amplitude modulation (16-QAM), thirty-two-symbol quadrature amplitude modulation (32-QAM), sixty-four-symbol quadrature amplitude modulation (64-QAM), one hundred and twenty-eight-symbol quadrature amplitude modulation (128-QAM), two hundred and fifty-six-symbol quadrature amplitude modulation (256-QAM) and others.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A wireless network base station comprising:
a channel controller for configuring the wireless network base station to communicate on at least a first channel having a plurality of subcarriers across a first bandwidth allocation and a second channel having a plurality of subcarriers across a second bandwidth allocation, wherein the channel controller selects a first modulation technique to modulate a first subcarrier of the first channel that is proximate the second channel and selects a second modulation technique to modulate a second subcarrier of the first channel distant from the second channel.

2. The wireless network base station of claim 1, wherein the second modulation technique is a higher-order modulation technique than the first modulation technique.

3. The wireless network base station of claim 2, wherein the channel controller selects the first and second modulation techniques according to the amount of interference caused by the second channel in the first and second subcarriers.

4. The wireless network base station of claim 3, wherein the channel controller selects the first modulation technique to modulate a third subcarrier of the first channel that is proximate the second channel.

5. The wireless network base station of claim 4, wherein the channel controller selects a third modulation technique to modulate a fourth subcarrier of the first channel that is distant from the second channel, wherein the third modulation technique is a higher-order modulation technique than the second modulation technique.

6. The wireless network base station of claim 3, wherein the wireless network base station supports orthogonal frequency division multiplexing.

7. The wireless network base station of claim 2, wherein the first and second modulation techniques are selected from the group consisting of binary phase shift keying, quadrature phase shift keying, eight symbol phase shift keying, eight-symbol quadrature amplitude modulation, sixteen-symbol quadrature amplitude modulation, thirty-two-symbol quadrature amplitude modulation, sixty-four-symbol quadrature amplitude modulation, one hundred and twenty-eight-symbol quadrature amplitude modulation and two hundred and fifty-six symbol quadrature amplitude modulation.

* * * * *